US006827542B1

(12) United States Patent
Stragier

(10) Patent No.: US 6,827,542 B1
(45) Date of Patent: Dec. 7, 2004

(54) REFUSE PACKER ASSEMBLY

(75) Inventor: Marcel G. Stragier, Scottsdale, AZ (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/430,852

(22) Filed: May 6, 2003

(51) Int. Cl.[7] ........................ B60P 1/00

(52) U.S. Cl. ........................ 414/525.2; 414/525.5; 414/406

(58) Field of Search ........................ 414/525.1, 525.2, 414/525.5, 303, 404, 406

(56) References Cited

U.S. PATENT DOCUMENTS 5,458,058 A * 10/1995 Zeronian et al. ......... 414/525.2
5,513,942 A 5/1996 Pickrell ................... 414/525.2
6,497,547 B1 * 12/2002 Maglaras ................. 414/525.2

FOREIGN PATENT DOCUMENTS

GB 1165090 * 9/1969 ............. 414/525.5

* cited by examiner

*Primary Examiner*—James R. Bidwell
(74) *Attorney, Agent, or Firm*—Parsons&Goltry; Robert A. Parsons; Michael W. Goltry

(57) ABSTRACT

A platen packer assembly mounted in a refuse collection truck is disclosed. The refuse collection truck has a semi-cylindrical hopper, with a vertical axis and a horizontal radius, constructed to receive collected refuse and an enclosed body in communication with the hopper for receiving refuse from the hopper. The packer assembly includes a vertical mounting shaft extending within the hopper coaxial with the vertical axis of the hopper. A wedge-shaped platen has an end affixed to the shaft for rotation about the vertical axis and a refuse contacting major surface extending horizontally from the end slightly less than the radius of the hopper and slanted upwardly at an angle to the horizontal to provide an upward packing force component. The packer assembly is removably mounted through a removable portion of the floor for installation, repair, or replacement.

21 Claims, 8 Drawing Sheets

FIG. 1
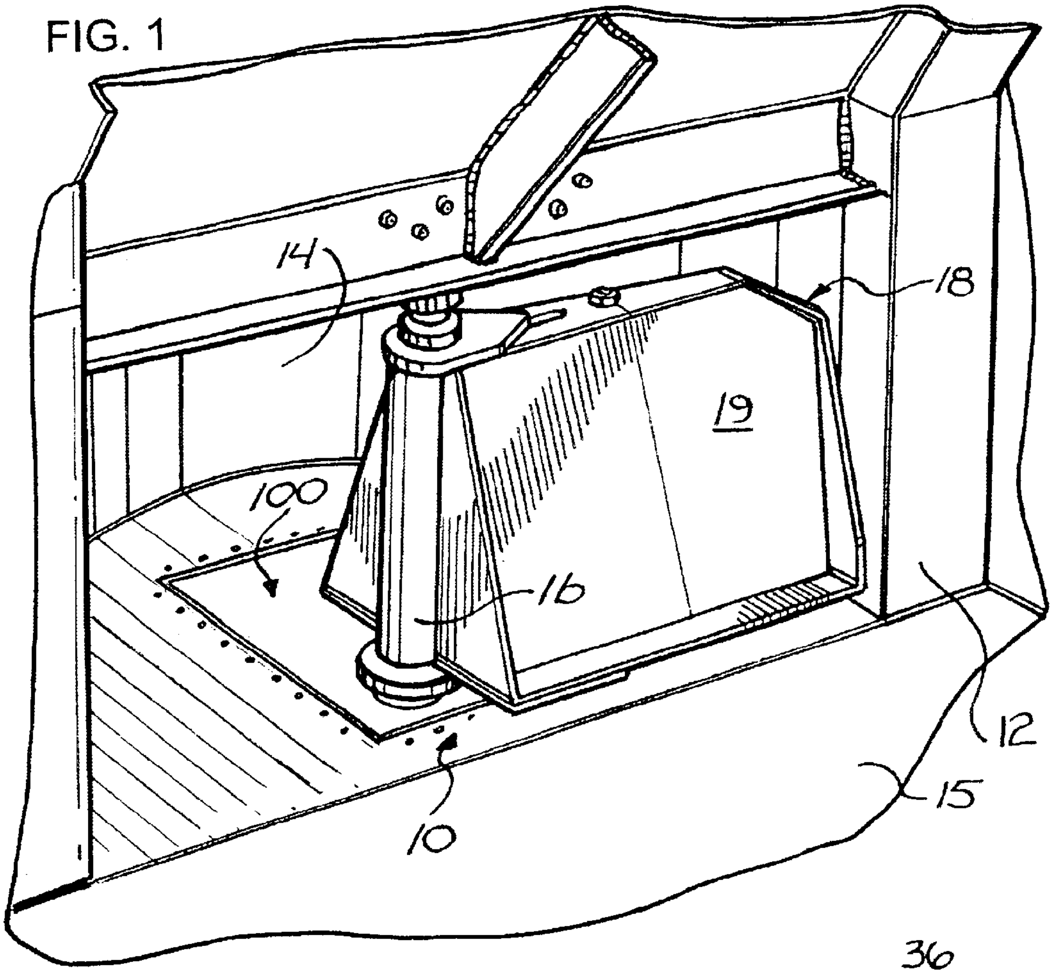
FIG. 3
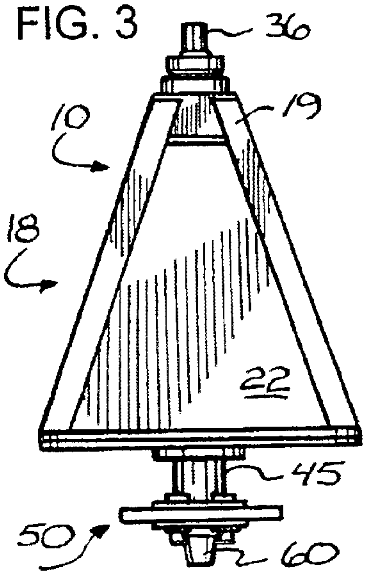
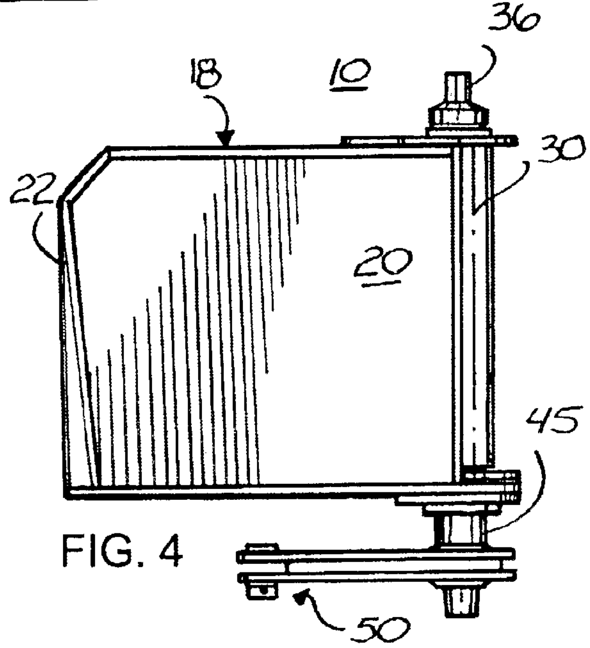
FIG. 4

FIG. 5
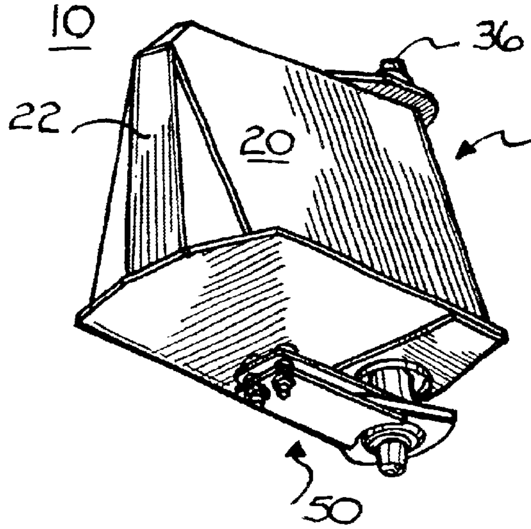
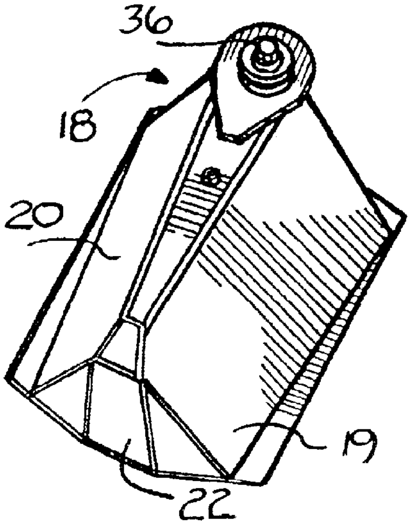
FIG. 6
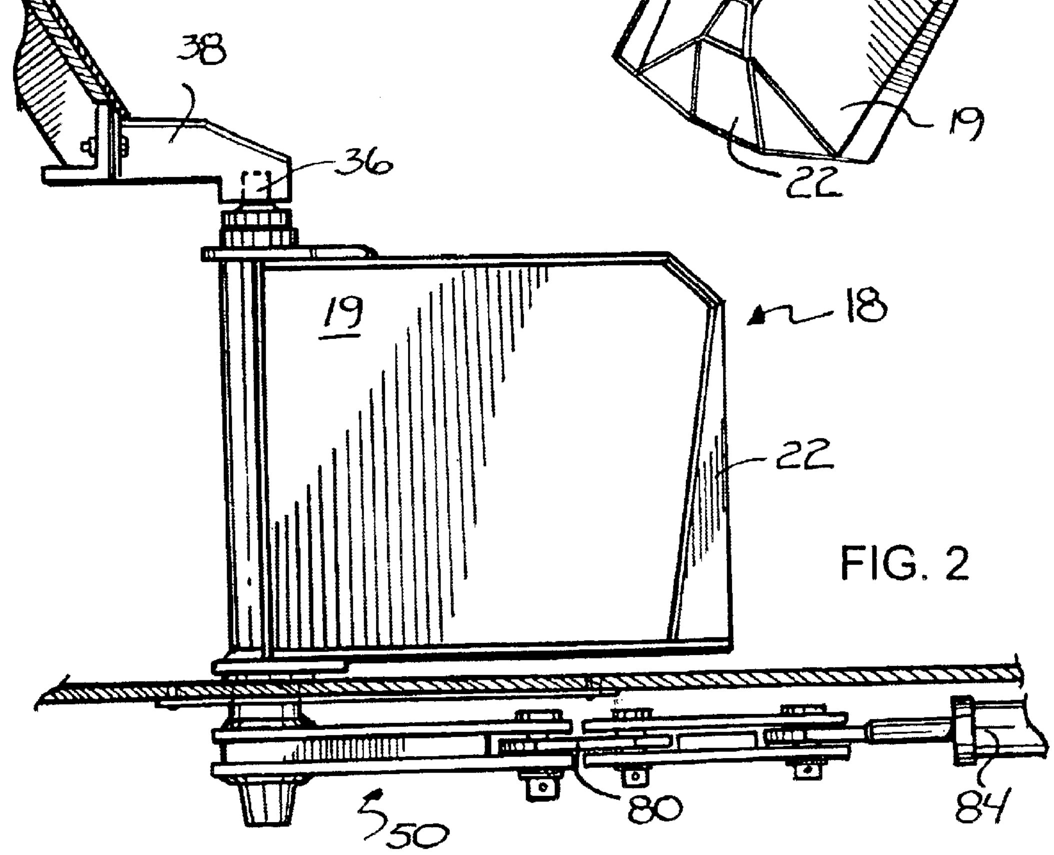
FIG. 2

FIG. 9
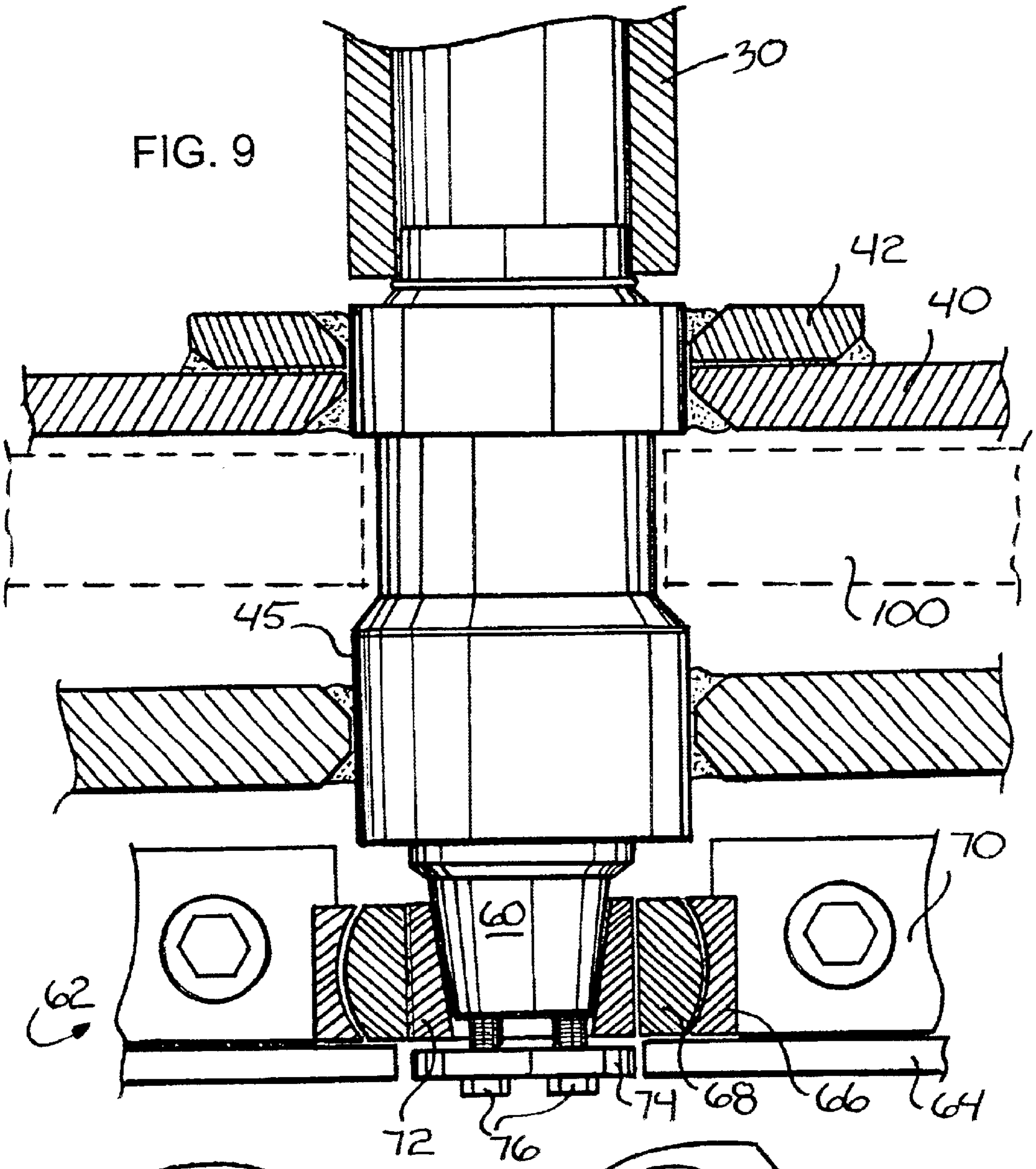
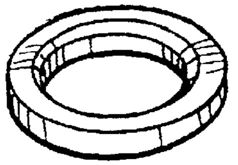
FIG. 11
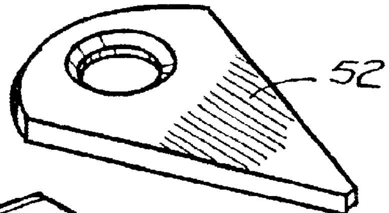
FIG. 12
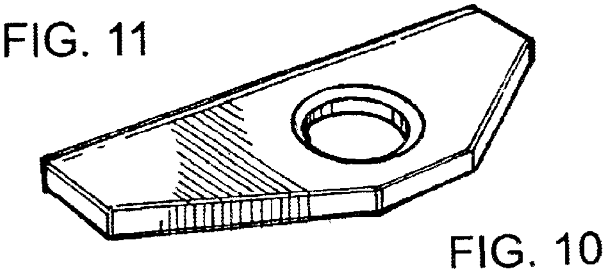
FIG. 10

FIG. 14
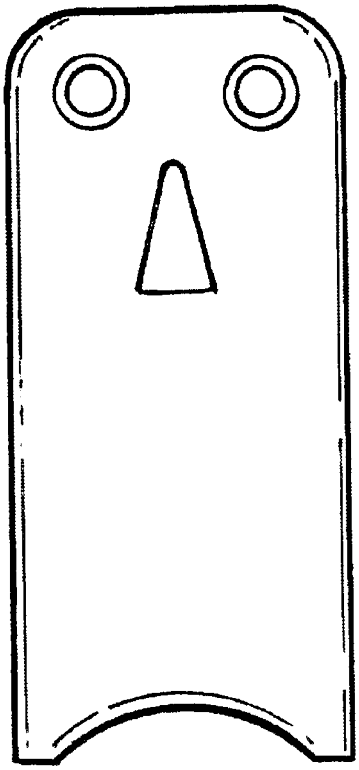
FIG. 15
FIG. 16
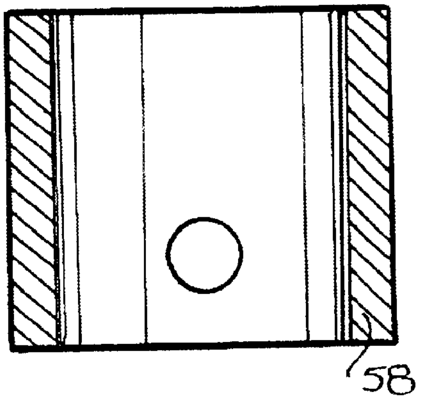
FIG. 17
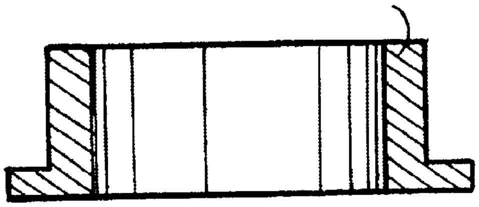
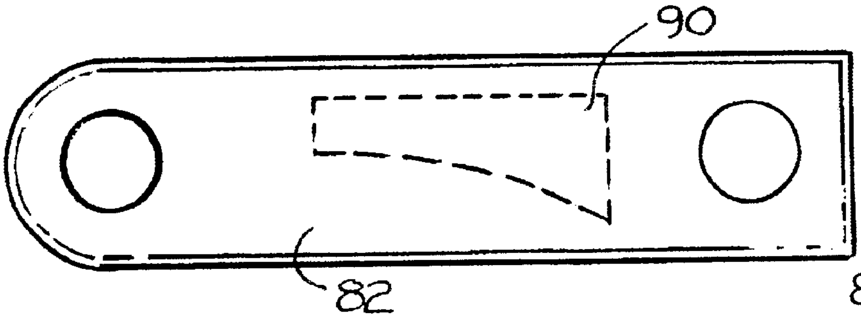
FIG. 18
FIG. 19
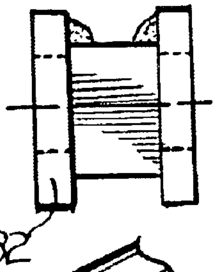
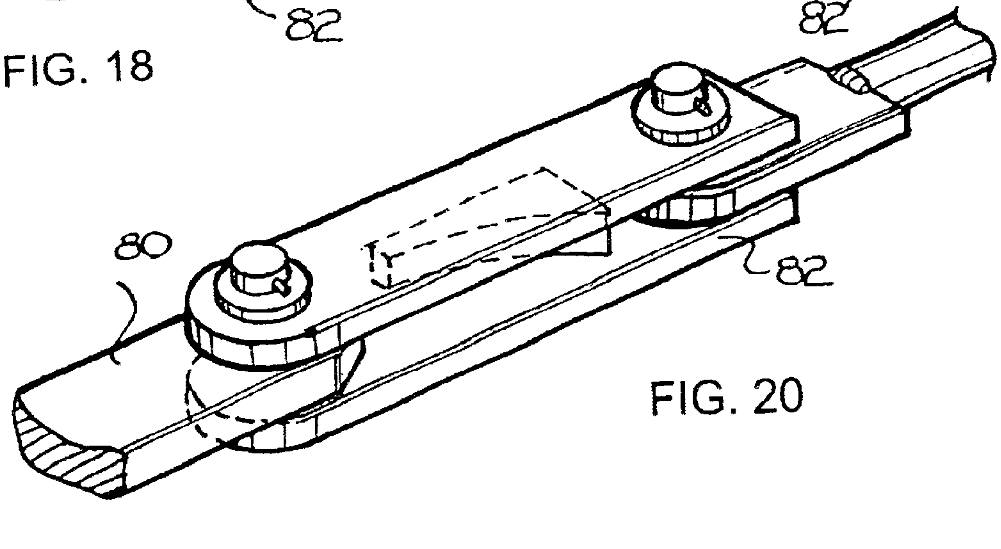
FIG. 20

FIG. 21
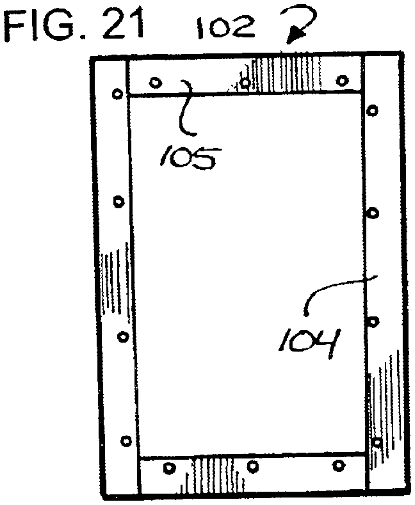
FIG. 24
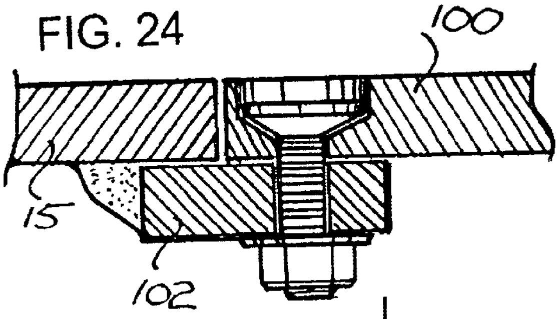
FIG. 25
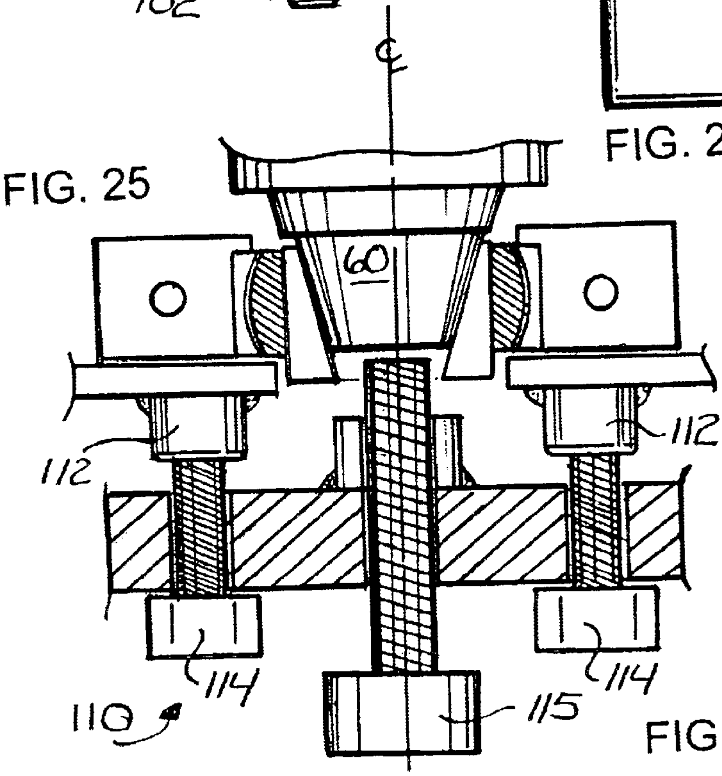
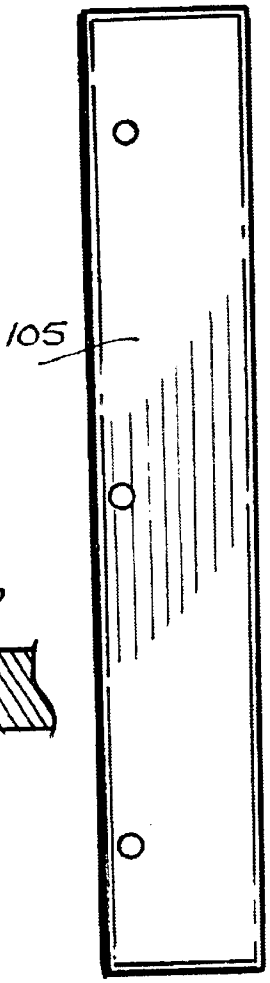
FIG. 23
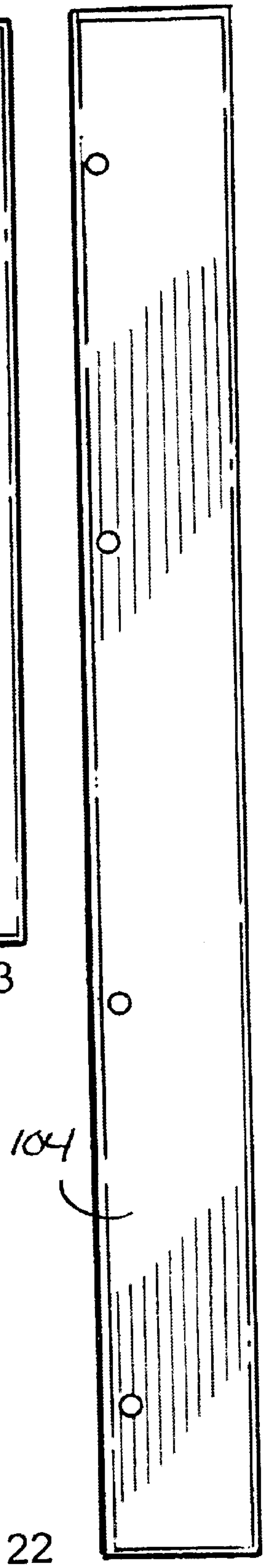
FIG. 22

FIG. 27
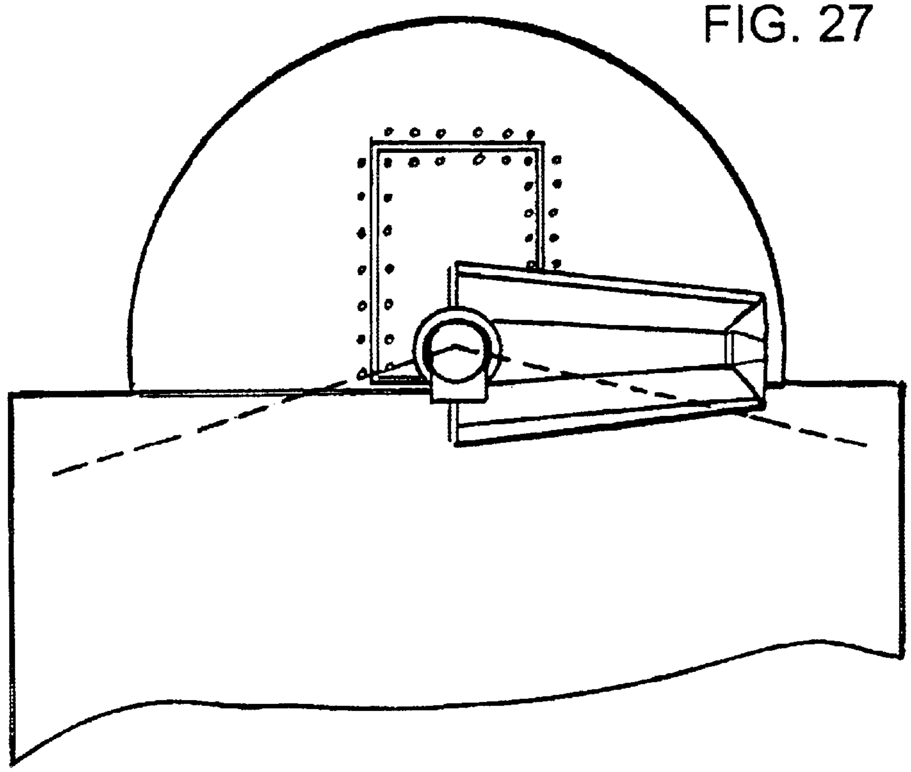
FIG. 26
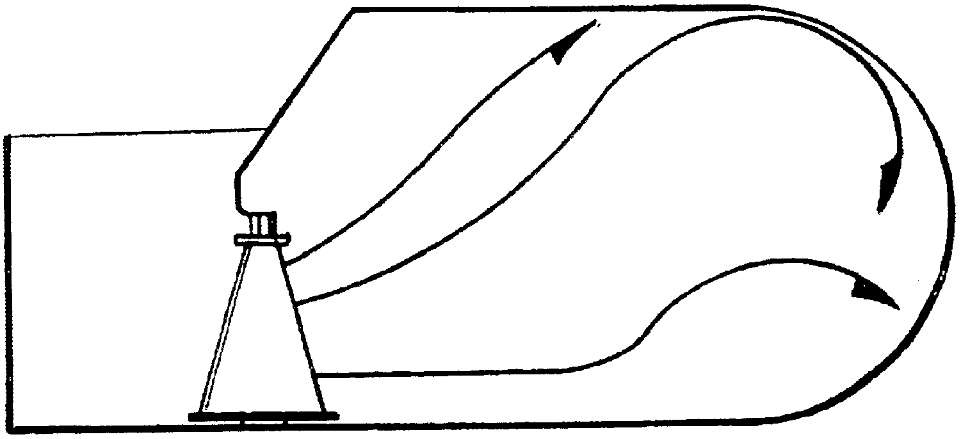
FIG. 28

REFUSE PACKER ASSEMBLY

FIELD OF THE INVENTION

This invention relates to refuse packers in refuse collection vehicles and more specifically to reciprocating or pivoting platen packers.

BACKGROUND OF THE INVENTION

In the refuse collection industry, large trucks with enclosed bodies are used in the collection process. Generally, the refuse is picked up in small containers that are emptied into a hopper, formed within the enclosed body of the truck, through an opening near the top and at one end. Once a smaller amount of refuse is emptied into the hopper of the enclosed body it must be packed, or moved toward the opposite end, to clear the hopper and make room for more refuse.

A number of different types of packers are employed in the industry, but the reciprocating rotating platen type is of concern in this instance. In general, this type of packer includes a flat vertically oriented paddle pivotally mounted adjacent the refuse inlet. The paddle, generally known as a platen, is reciprocally driven from an at rest position approximately ninety degrees in opposite directions. As the platen pivots or rotates, it drives refuse from the hopper or inlet area toward an opposite side or end, so that the enclosed body can eventually be filled with refuse.

Several major problems are prevalent in prior art platen packers. Generally, the platen or paddle drives the refuse in a horizontal direction directly toward the opposite side of the enclosed body. This results in refuse being packed tightly at floor level but in many instances the upper reaches of the enclosed body are empty or only lightly packed. If the enclosed bodies of the refuse trucks are not completely full, much valuable time is spent on traveling to and from dumping areas, greatly increasing the cost of refuse collection.

Replacement cost and truck down-time is another major problem associated with platen type packers. Generally, the reciprocating paddles are pivotally mounted on a vertical pivot pin or shaft which is substantially permanently mounted to the truck body. Because enormous pressure is required to drive refuse the length of the enclosed body during the packing process, the bearings and/or other moving parts of the platen packer have a tendency to wear very rapidly. In the prior art platen packers the only way to remove the worn components is to cut the pivot shaft, remove and replace the worn parts, and weld in place a new shaft with the new parts assembled thereon. This process is long and costly. Further, the refuse truck is out of service for a substantial length of time, which further increases the cost to the refuse collecting agency.

It would be highly advantageous, therefore, to remedy the foregoing and other deficiencies inherent in the prior art.

Accordingly, it is an object the present invention to provide a new and improved platen packer assembly.

Another object of the present invention is to provide a new and improved platen packer assembly that is constructed to pack refuse more thoroughly and efficiently.

And another object of the present invention is to provide a new and improved platen packer assembly which is relatively easily replaced when damaging wear occurs.

Still another object of the present invention is to provide a new and improved platen packer assembly which substantially reduces the down-time of refuse trucks.

Yet another object of the present invention is to provide a new and improved platen packer assembly which can be manufactured and installed, and worn assemblies can be replaced, as a complete unit.

And still another object of the present invention is to provide a platen which rotates over ninety degrees to increase the displaced volume and thus enlarge the volume of the hopper which can be filled.

A further object of the present invention is to provide a new and improved platen packer assembly which can be built into new refuse trucks or substituted in used trucks for prior art platen packers.

SUMMARY OF THE INVENTION

The above problems and others are at least partially solved and the above objects and others realized in a new and improved platen packer assembly including a mounting shaft with a substantially vertical axis of rotation and a platen. The platen has a first end affixed to the shaft for rotation of the platen about the vertical axis and at least one refuse contacting major surface extending horizontally from the first end. The refuse contacting major surface is slanted upwardly at an angle to the horizontal to provide an upward packing force component against refuse being packed. In a preferred embodiment the platen is wedge-shaped with a larger base slanted toward an upper edge from both major surfaces.

The above problems and others are further solved and the above objects and others further realized in a new and improved platen packer assembly mounted in a refuse collection truck. The refuse collection truck has a semi-cylindrical hopper constructed to receive collected refuse and an enclosed body in communication with the hopper for receiving refuse from the hopper. The hopper and enclosed body share a flat floor and the hopper has a vertical axis and a horizontal radius. A portion of the floor in the hopper is opened and supplied with a removable floor piece. A removable packer assembly is installed in the truck.

The removable packer assembly includes a mounting shaft with a substantially vertical axis of rotation. The mounting shaft extends within the hopper approximately coaxial with the vertical axis of the hopper and has a lower end below the removable portion of the floor. The packer assembly further includes a platen having a first end affixed to the mounting shaft for rotation of the platen about the vertical axis of rotation. The platen has at least one refuse contacting major surface extending horizontally from the first end slightly less than the radius of the hopper. A first bearing is affixed to the lower end of the mounting shaft and a second bearing is affixed to an upper opposed end of the mounting shaft for rotation of the mounting shaft about the vertical axis of rotation. The lower end of the mounting shaft includes a tapered portion and a locking wedge removably affixing the tapered portion to a rotatable portion of the first bearing affixed to the lower end of the mounting shaft. The second bearing is held in a removable bearing mount. The removable bearing mount is provided to allow the mounting shaft and platen to be disengaged as a unit. Connecting links and hydraulic pistons, positioned below the removable portion of the floor in the hopper, are coupled to the platen for rotation of the platen in both a clockwise and a counterclockwise direction.

BRIEF DESCRIPTION OF THE DRAWINGS

The foregoing and further and more specific objects and advantages of the invention will become readily apparent to those skilled in the art from the following detailed description taken in conjunction with the drawings in which:

FIG. 1 is a perspective view of a platen packer assembly installed in a refuse truck in accordance with the present invention;

FIG. 2 is a side view of the platen packer and truck, portions thereof removed and shown in section;

FIG. 3 is an end view of the platen packer assembly;

FIG. 4 is a side view of the platen packer assembly;

FIG. 5 is a view in perspective of the platen packer assembly from the bottom-front;

FIG. 6 is a view in perspective of the platen packer assembly from the top-front;

FIG. 9 is a partial sectional view of the platen packer assembly mounted on a truck floor, portions thereof broken away;

FIGS. 10 and 11 are perspective views of a base plate and donut for the platen;

FIG. 12 is a perspective view of an actuator plate;

FIG. 14 is a bottom view of a pin plate for the actuator;

FIG. 15 is a side view of the pin plate of FIG. 14;

FIG. 16 is an enlarged sectional view of an upper bushing for the upper pin plate of the actuator;

FIG. 17 is an enlarged sectional view of a lower bushing for the lower pin plate of the actuator;

FIGS. 18 and 19 are enlarged top and end views of a hydraulic link;

FIG. 20 is a perspective view of the hydraulic link of FIG. 18 connected into the system;

FIG. 21 is a bottom view of a floor frame surrounding an opening in a truck floor;

FIGS. 22 and 23 are plan views of the floor frame components;

FIG. 24 is a partial view illustrating the removable floor section assembled in the floor frame, portions thereof broken away;

FIG. 25 is a sectional view illustrating a removal tool and removal of the platen packer assembly from the lower mounting bearing;

FIG. 26 is a sectional view of the removable floor section assembled in the fixed floor frame;

FIG. 27 is a view in top plan of the platen packer assembly in a refuse truck; and FIG. 28 is a simplified view of the operation of the platen packer assembly.

DETAILED DESCRIPTION OF A PREFERRED EMBODIMENT

Figures 7, 8:
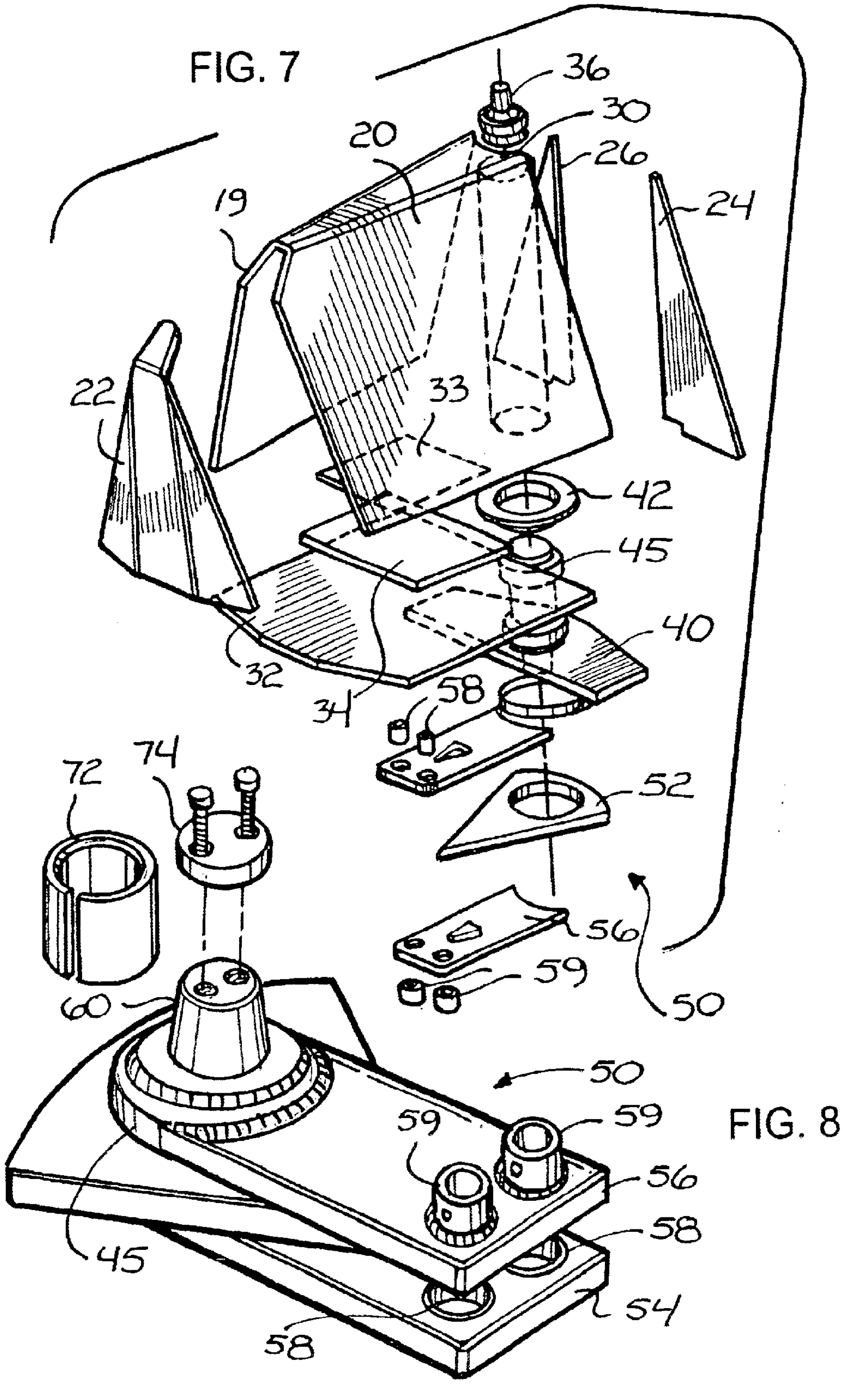
FIG. 7 is a exploded perspective view of the platen packer assembly.
FIG. 8 is a bottom perspective view of the actuator of the platen packer assembly.

Turning to the drawings, in which like reference characters indicate corresponding elements throughout the several views, attention is first directed to FIG. 1, which illustrates a platen packer assembly 10 installed in a refuse truck 12 in accordance with the present invention. Truck 12 includes a hopper 14 with a generally semicircular cross-section and a floor 15 into which refuse is first conveyed. Assembly 10 includes a vertical pivot pin or shaft 16 coaxially mounted at approximately the axis of hopper 14, in a manner that will be described in more detail below. Assembly 10 further includes a platen 18 fixedly attached to shaft 16 for rotation therewith. Platen 18 has a horizontal dimension slightly less than the radius of hopper 14. Thus, platen 18 is free to rotate about shaft 16 in hopper 14.

Referring additionally to FIGS. 3 through 6, assembly 10 is illustrated from four different views to illustrate the generally wedge shape of platen 18 and the orientation of the various components. Referring to FIG. 7, it can be seen that in this embodiment platen 18 is formed with a single plate bent to define two major surfaces 19 and 20 that taper together from the bottom toward the top to form the generally wedge shape. Surfaces 19 and 20 are joined at the outer end by a generally triangularly shaped plate 22 and are affixed by two triangularly shaped plates 24 and 26 to a cylindrically shaped element 30. A lower or bottom plate 32 is connected to the lower edges of the various plates to substantially enclose platen 18. Horizontal cross supports 33 and 34 may be included within platen 18 to add additional support, if desired. In this preferred embodiment element 30 is a section of heavy pipe that forms a part of shaft 16. The various plates and elements may be welded together or otherwise permanently connected to provide the necessary strength and rigidity.

An upper bearing 36 is affixed to the upper end of element 30 of shaft 16 and is designed to be received within a bearing mount 38 that is removably attached to an inner frame portion of hopper 14, as illustrated in FIG. 2. Also, a base plate 40 (see FIG. 10) and donut or collar 42 (see FIG. 11) attach a lower shaft section 45 of shaft 16 to the lower end of element 30. In this preferred embodiment an upper end of shaft section 45 is coaxially nested in the lower end of element 30. Base plate 40 has an opening formed therethrough so that shaft section 45 can be inserted through the opening to position base plate 40 around shaft section 45. Collar 42 is affixed to an upper surface of base plate 40, by welding or the like, so that the openings are coaxial. Base plate 40 is affixed to bottom plate 32 of platen 18, by welding or the like and the entire assembly is affixed to shaft section 45 by affixing base plate 40 and collar 42 to shaft section 45, e.g. by welding or the like.

An actuator, generally designated 50, is attached adjacent a lower end of shaft section 45. Actuator 50 includes an actuator plate 52 sandwiched between an upper pin plate 54 and a lower pin plate 56. Actuator plate 52 has an opening therethrough for receiving the lower end of shaft section 45, as seen in FIG. 12. Pin plates 54 and 56 each have an arcuately shaped end that substantially coaxially mates with an outer diameter of shaft section 45. Each of pin plates 54 and 56 are fixedly attached to shaft section 45 by welding or the like with actuator plate 52 sandwiched therebetween, as seen inverted in FIG. 8. A pair of bushings 58 (see FIG. 16) are positioned in holes adjacent an outer end of upper pin plate 54 and a pair of bushings 59 (see FIG. 17) are positioned in holes adjacent an outer end of lower pin plate 56.

The lower end 60 of shaft section 45 is tapered toward the lower end so that it is shaped like the frustum of a cone (a truncated cone) as can be seen by referring to FIGS. 8 and 9. A packer mounting assembly, generally designated 62, is affixed to a frame 64 of refuse truck 12 below floor 15 of hopper 14. Packer mounting assembly 62 includes a large spherical ball bearing with an outer race 66 and an inner race 68. Outer race 66 is mounted on frame 64 by means of journal block 70. A ring shaped locking wedge 72 with an inner tapered surface, generally mirroring the taper of lower end 60 of shaft section 45, is positioned between lower end 60 and inner race 68.

To properly mount the lower end of shaft 16, a disc clamp 74 is positioned in engagement with a lower surface of locking wedge 72 and a pair of cap screws or bolts 76 are threaded into holes in the end of shaft section 45. Bolts 76 are gradually tightened to uniformly force locking wedge 72 between tapered end 60 of shaft section 45 and inner race 68 of the ball bearing. As bolts 76 are tightened, locking wedge 72 tightly locks inner race 68 to tapered potion 60 of shaft section 45, thereby rotatably affixing shaft 16 to frame 64 of refuse truck 12 below floor 15 of hopper 14.

Once platen packer assembly 10 is rotatably mounted on truck 12, actuator 50 is attached to the hydraulic system. In this embodiment, a first pair of single links 80 each have one end extending between pin plates 54 and 56, respectively, and each is rotatably held in place by pins extending through bushings 58 and 59. The opposite ends of links 80 are attached by a pair of double links 82 each to a different one of a pair of co-acting hydraulic cylinders 84 and 86. Hydraulic cylinders 84 and 86 are connected into the hydraulic system of truck 12 so that when the piston of cylinder 84 moves outward the piston of cylinder 86 moves inward and vice versa. Thus, hydraulic cylinders 84 and 86 can be actuated to rotate shaft 16 and platen 18 in clockwise and counterclockwise directions. To clarify an illustration, FIG. 2 has been drawn with cylinder 84 positioned towards the front. IT should be noted that cylinder 84 and the attached links back to pin 80 extend backwards and are shown in this position solely for the purpose of providing an unobstructed view of the entire assembly.

Figure 13:
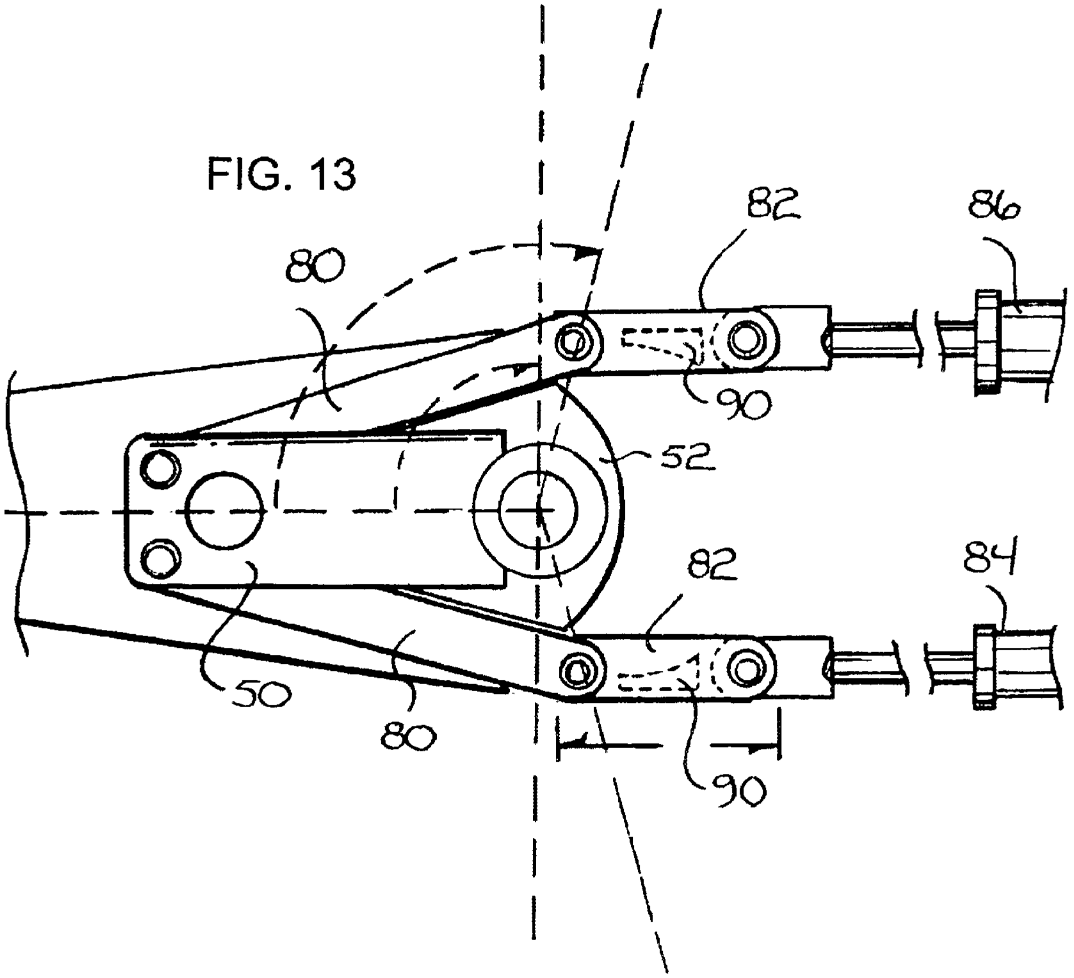
FIG. 13 is a bottom view of the actuator connected into the truck hydraulic system.

Referring additionally to FIG. 18, it can be seen that an actuator limit switch 90 is sandwiched between each pair of double links 82. Each switch 90 has an arcuate surface directed inwardly toward actuator 50. Further, actuator plate 52 has an arcuate end that substantially matches the arcs of limit switches 90. As can be seen by referring to FIG. 13, when actuator 50 and shaft 16 are rotated, either clockwise or counterclockwise, approximately ninety degrees from the center rest position the arcuate surface of actuator plate 52 contacts one of the limit switches 90. The contacted limit switch 90 causes the hydraulic system to change direction to rotate actuator 50 and shaft 16 in the opposite direction. Limit switches 90 can be set to allow rotary movement of shaft 16 and platen 18 slightly greater than ninety degrees, if desired, which aids in clearing hopper 14 and provides more efficient refuse packing. The additional movement can be as great as an additional ten to fifteen degrees.

Prior to installation of packer assembly 10, a small rectangular portion 100 of floor 15 in hopper 14 is removed to facilitate the installation, as can best be seen in FIG. 1. Here it will be understood that the new packer assembly 10 can be installed in refuse trucks already in operation or in new trucks just being manufactured. Assuming refuse truck 12 is already in operation, portion 100 is removed (using a cutting torch or the like) as conveniently as possible. A frame 102 (FIG. 21) is installed around the opening by welding or otherwise affixing side elements 104 (FIG. 22) and end elements 105 (FIG. 23) to the underside of the opening. Elements 104 and 105 of frame 102 have spaced holes formed therethrough in a portion that overlaps the opening in floor 15. Portion 100 of floor 15 is provided with matching countersunk holes around the periphery.

After packer assembly 10 is installed and adjusted for the desired rotation, portion 100 of floor 15 is provided with a cutout, in this embodiment near the rear end, as illustrated in FIGS. 1 and 26. Thus, portion 100 can be slipped into the opening with the cutout partially surrounding shaft 16, as illustrated in FIG. 9. Portion 100 is then bolted into place as illustrated, for example, in FIG. 24.

If at any time during the use or life of packer assembly 10 something breaks or becomes worn (e.g. outer race 66 or inner race 68 of the mounting bearing), portion 100 of floor 15 can be easily removed and packer assembly 1Q, or any portion, can be removed and replaced. To disassemble shaft 16 from the mounting bearing, a gear puller tool, generally designated 110 and illustrated in FIG. 25, is used. Tool 110 is installed by welding nuts 112 to the underside of frame 64 of refuse truck 12 generally below journal block 70. Bolts 114 are threaded into nuts 112 to hold tool 110 in place. Tool 110 is then used substantially in the same manner as a gear puller by tightening a central bolt 115 to force the tapered end 60 of shaft 16 out of engagement with locking wedge 72. Packer assembly 10 can then be removed and either a replacement installed, in a matter of minutes, or the damaged unit can be repaired and re-installed.

One of the major problems with prior art platen packers is that they drive the refuse in a horizontal direction directly toward the opposite side of the enclosed body of the refuse truck. This results in refuse being packed tightly at floor level but in many instances the upper reaches of the enclosed body are empty or only lightly packed. Here it should be specifically noted that the platen disclosed in the present packer is generally wedge shaped so that the side pushing against the refuse introduces an upward component of force to the refuse. This upward force component tends to role refuse upwardly as well as rearwardly (or toward the opposite side of the container), as illustrated in FIG. 28. This upward and rearward force tends to pack the refuse more uniformly throughout the container both in a vertical and a horizontal direction. Generally the direction of the upward force is at an angle to the horizontal of between ten degrees and thirty degrees. Therefore, each truck can be filled more uniformly and efficiently to save trips and reduce cost.

Thus, a new and improved platen packer assembly is disclosed that is constructed to pack refuse more thoroughly and efficiently. The new and improved platen packer assembly is relatively easily replaced when damaging wear occurs, which substantially reduces the down-time of refuse trucks. Further, the new and improved platen packer assembly can be manufactured and installed in new or used trucks, and worn assemblies can be replaced, as a complete unit or removed and repaired. Also, because of the unique shape of the platen, refuse is more uniformly and efficiently packed to reduce unused space and to increase the efficiency and operation of the refuse truck.

The invention has been described above with reference to one or more preferred embodiments. However, those skilled in the art will recognize that changes and modifications may be made in the described embodiments without departing from the nature and scope of the invention. For instance, the angular shape of the platen can be increased or altered to change the angle of packing force applied to the refuse being packed.

Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. A platen packer assembly comprising:

a mounting shaft with a substantially vertical axis of rotation;

a platen having a first end affixed to the shaft for rotation of the platen about the vertical axis, the platen having at least one refuse contacting major surface extending horizontally from the first end, the at least one refuse contacting major surface being slanted upwardly at an angle to the horizontal to provide an upward packing force component against refuse being packed; and wherein the platen includes a wedge shaped vertical cross-section with two opposed refuse contacting major surfaces extending horizontally from the first end, each of the two opposed refuse contacting major surfaces being slanted upwardly at an angle to the horizontal to provide an upward packing force component.

2. A platen packer assembly as claimed in claim 1 wherein the platen is affixed to the shaft for rotation about the vertical axis of at least ninety degrees from an at-rest position in both a clockwise and a counterclockwise direction.

3. A platen packer assembly as claimed in claim 2 wherein the platen is adjustable for rotation of between ninety degrees and one hundred and ten degrees in both a clockwise and a counterclockwise direction.

4. A platen packer assembly as claimed in claim 3 including connecting links and hydraulic pistons coupled to the platen for rotation in both the clockwise and the counterclockwise directions.

5. A platen packer assembly as claimed in claim 4 further including adjustable limit switches coupled to the connecting links to provide adjustable rotation limits.

6. A platen packer assembly comprising:

a mounting shaft with a substantially vertical axis of rotation;

a platen having a first end affixed to the shaft for rotation of the platen about the vertical axis, the platen having at least one refuse contacting major surface extending horizontally from the first end, the at least one refuse contacting major surface being slanted upwardly at an angle to the horizontal to provide an upward packing force component against refuse being packed;

a first bearing is affixed to a first end of the mounting shaft and a second bearing is affixed to a second opposed end of the mounting shaft for rotation of the mounting shaft about the vertical axis of rotation; and wherein the second bearing is held in a removable bearing mount, the removable bearing mount being removable to allow the mounting shaft and platen to be disengaged as a unit.

7. A platen packer assembly as claimed in claim 6 wherein the first end of the mounting shaft includes a tapered portion and a locking wedge removably affixing the tapered portion to a rotateable portion of the first bearing affixed to the first end of the mounting shaft.

8. A platen packer assembly as claimed in claim 7 wherein the first bearing is a ball bearing with an inner rotateable race and a fixed outer race and the locking wedge removably affixes the tapered portion to the inner race.

9. A platen packer assembly mounted in a refuse collection truck comprising:

a refuse collection truck having a semi-cylindrical hopper constructed to receive collected refuse and an enclosed body in communication with the hopper for receiving refuse from the hopper, the hopper and enclosed body sharing a flat floor, and the hopper having a vertical axis and a horizontal radius;

a mounting shaft with a substantially vertical axis of rotation, the mounting shaft extending within the hopper approximately coaxial with the vertical axis of the hopper; and a platen having a first end affixed to the mounting shaft for rotation of the platen about the vertical axis of rotation of between ninety degrees and one hundred and ten degrees in both a clockwise and a counterclockwise direction, the platen having at least one refuse contacting major surface extending horizontally from the first end less than the radius of the hopper, the at least one refuse contacting major surface being slanted upwardly at an angle to the horizontal to provide an upward packing force component against refuse being packed;

connecting links and hydraulic pistons are coupled to the platen for rotation in both the clockwise and the counterclockwise directions; and a portion of the floor of the hopper is removable, the mounting shaft extends through the removable portion of the floor, and the connecting links and hydraulic pistons are positioned below the removable floor portion.

10. A platen packer assembly mounted in a refuse collection truck as claimed in claim 9 further including adjustable limit switches coupled to the connecting links to provide adjustable rotation limits.

11. A platen packer assembly mounted in a refuse collection truck comprising:

a refuse collection truck having a semi-cylindrical hopper constructed to receive collected refuse and an enclosed body in communication with the hopper for receiving refuse from the hopper, the hopper and enclosed body sharing a flat floor, and the hopper having a vertical axis and a horizontal radius;

a mounting shaft with a substantially vertical axis of rotation, the mounting shaft extending within the hopper approximately coaxial with the vertical axis of the hopper;

a platen having a first end affixed to the mounting shaft for rotation of the platen about the vertical axis of rotation, the platen having at least one refuse contacting major surface extending horizontally from the first end less than the radius of the hopper, the at least one refuse contacting major surface being slanted upwardly at an angle to the horizontal to provide an upward packing force component against refuse being packed;

the platen includes a wedge shaped vertical cross-section with two opposed refuse contacting major surfaces extending horizontally from the first end, each of the two opposed refuse contacting major surfaces being slanted upwardly at an angle to the horizontal to provide an upward packing force component.

12. A platen packer assembly mounted in a refuse collection truck comprising:

a refuse collection truck having a semi-cylindrical hopper constructed to receive collected refuse and an enclosed body in communication with the hopper for receiving refuse from the hopper, the hopper and enclosed body sharing a flat floor, and the hopper having a vertical axis and a horizontal radius;

a mounting shaft with a substantially vertical axis of rotation, the mounting shaft extending within the hopper approximately coaxial with the vertical axis of the hopper;

a platen having a first end affixed to the mounting shaft for rotation of the platen about the vertical axis of rotation, the platen having at least one refuse contacting major surface extending horizontally from the first end less than the radius of the hopper, the at least one refuse contacting major surface being slanted upwardly at an angle to the horizontal to provide an upward packing force component against refuse being packed;

a first bearing is affixed to a first end of the mounting shaft and a second bearing is affixed to a second opposed end of the mounting shaft for rotation of the mounting shaft about the vertical axis of rotation; and the second bearing is held in a removable bearing mount, the removable bearing mount being removable to allow the mounting shaft and platen to be disengaged as a unit.

13. A platen packer assembly mounted in a refuse collection truck as claimed in claim 12 wherein the first end of the mounting shaft includes a tapered portion and a locking wedge removably affixing the tapered portion to a rotateable portion of the first bearing affixed to the first end of the mounting shaft.

14. A platen packer assembly mounted in a refuse collection truck as claimed in claim 13 wherein the first bearing is a ball bearing with an inner rotateable race and a fixed outer race and the locking wedge removably affixes the tapered portion to the inner race.

15. A platen packer assembly mounted in a refuse collection truck as claimed in claim 13 wherein a portion of the floor of the hopper is removable, the mounting shaft extends through the removable portion of the floor, and the first end of the mounting shaft and the tapered portion are positioned below the removable floor portion.

16. A platen packer assembly mounted in a refuse collection truck comprising:

a refuse collection truck having a semi-cylindrical hopper constructed to receive collected refuse and an enclosed body in communication with the hopper for receiving refuse from the hopper, the hopper and enclosed body sharing a flat floor, and the hopper having a vertical axis and a horizontal radius;

a removable portion of the floor in the hopper;

a mounting shaft with a substantially vertical axis of rotation, the mounting shaft extending within the hopper approximately coaxial with the vertical axis of the hopper and having a lower end below the removable portion of the floor; and a platen having a first end affixed to the mounting shaft for rotation of the platen about the vertical axis of rotation, the platen having at least one refuse contacting major surface extending horizontally from the first end less than the radius of the hopper;

a first bearing affixed to the lower end of the mounting shaft and a second bearing affixed to an upper opposed end of the mounting shaft for rotation of the mounting shaft about the vertical axis of rotation;

the lower end of the mounting shaft including a tapered portion and a locking wedge removably affixing the tapered portion to a rotateable portion of the first bearing affixed to the lower end of the mounting shaft, the second bearing being held in a removable bearing mount, and the removable bearing mount being removable to allow the mounting shaft and platen to be disengaged as a unit; and connecting links and hydraulic pistons coupled to the platen for rotation of the platen in both a clockwise and a counterclockwise direction, the connecting links being positioned below the removable portion of the floor in the hopper.

17. A platen packer assembly mounted in a refuse collection truck as claimed in claim 16 wherein the platen is affixed to the shaft for rotation about the vertical axis of at least ninety degrees from an at-rest position in both the clockwise and the counterclockwise direction.

18. A platen packer assembly mounted in a refuse collection truck as claimed in claim 17 wherein the platen is adjustable for rotation of between ninety degrees and one hundred and ten degrees in both the clockwise and the counterclockwise direction.

19. A platen packer assembly mounted in a refuse collection truck as claimed in claim 18 further including adjustable limit switches coupled to the connecting links to provide adjustable rotation limits.

20. A platen packer assembly mounted in a refuse collection truck as claimed in claim 16 wherein the platen has at least one refuse contacting major surface extending horizontally from the first end less than the radius of the hopper, the at least one refuse contacting major surface being slanted upwardly at an angle to the horizontal to provide an upward packing force component against refuse being packed.

21. A platen packer assembly mounted in a refuse collection truck as claimed in claim 20 wherein the platen includes a wedge shaped vertical cross-section with two opposed refuse contacting major surfaces extending horizontally from the first end, each of the two opposed refuse contacting major surfaces being slanted upwardly at an angle to the horizontal to provide an upward packing force component.

* * * * *